F. C. BASINGER.
TOY ELECTRIC MOTOR.
APPLICATION FILED DEC. 15, 1916.
1,234,261.
Patented July 24, 1917.
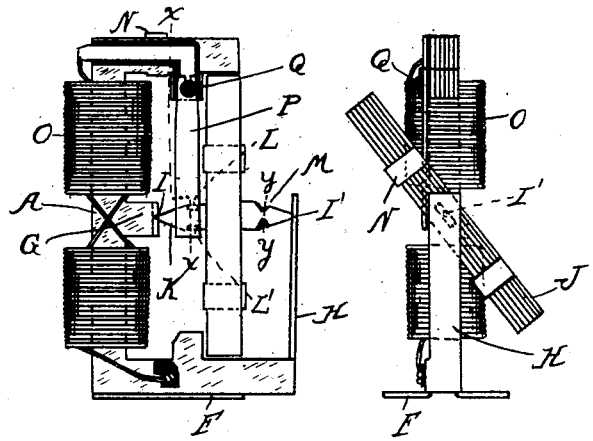
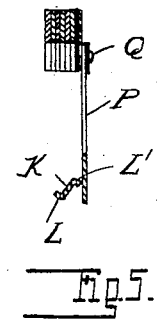
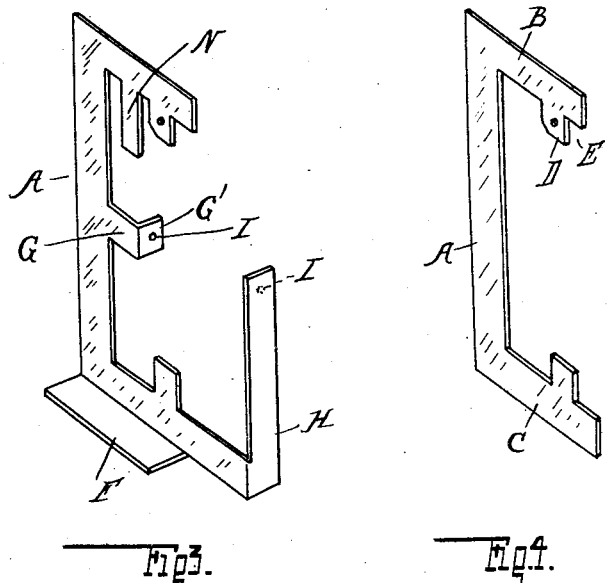
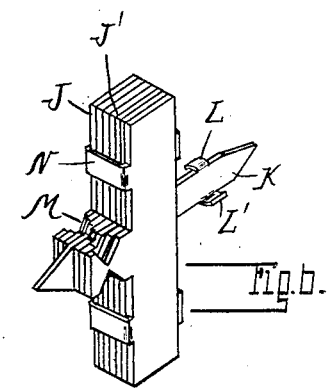
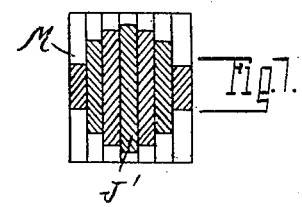
Inventor
Frederic K.C. Basinger
By Whittemore Hulbert & Whittemore
Attorneys

UNITED STATES PATENT OFFICE.

FREDERICK C. BASINGER, OF ROYAL OAK, MICHIGAN, ASSIGNOR OF ONE-HALF TO PAUL J. BAILEY, OF DETROIT, MICHIGAN.

TOY ELECTRIC MOTOR.

1,234,261.      Specification of Letters Patent.      Patented July 24, 1917.

Application filed December 15, 1916. Serial No. 137,217.

*To all whom it may concern:*

Be it known that I, FREDERICK C. BASINGER, a citizen of the United States of America, residing at Royal Oak, in the county of Oakland and State of Michigan, have invented certain new and useful Improvements in Toy Electric Motors, of which the following is a specification, reference being had therein to the accompanying drawings.

The invention relates to electric motors designed for use as toys, and it is the object of the invention to obtain a construction that can be manufactured at low cost and one which may be operated by a battery of low power. To this end the invention comprises the novel construction as hereinafter set forth.

In the drawings:

Figure 1 is a side elevation of the motor;

Fig. 2 is an end elevation thereof;

Fig. 3 is a perspective view of the outer lamination of the core, having the bearings for the armature formed thereon;

Fig. 4 is a similar view of one of the inner laminations of the core;

Fig. 5 is a section on line x—x Fig. 1, showing the commutator and brush;

Fig. 6 is an enlarged perspective view of the armature;

Fig. 7 is an enlarged section on line y—y Fig. 1.

To reduce the cost of manufacture all of the parts of the motor are made as far as possible of sheet-metal stampings and the construction is also one which permits of easily assembling these parts. In detail, the magnetic field-core for the motor is formed of a series of laminæ, each comprising a stamping of substantially U-form, having a longitudinal portion A and laterally-extending portions B and C. These laterally-extending portions are preferably provided with inwardly-extending lugs D forming angularly-grooved poles E. The outer stamping is provided, in addition to the parts already described, with a laterally-extending base flange F and with projecting arms G and H which are bent to form opposed bearings for the armature shaft. As shown, the arm G extends centrally from the portion A and is bent at right angles at G', being formed with an identation I to receive the pointed end of the armature shaft. The arm H, as shown, extends from the lower arm C, and is then bent laterally and extends upwardly to a point opposite the arm G, being provided with an indentation I' opposite the indentation I.

The armature is also laminated and is formed of a series of stampings J. One of these stampings, preferably the central member J', has formed integral therewith a transversely-extending portion K, which forms the armature shaft and is pointed at its opposite ends to engage the indentations I and I'. The portion K is also provided with bent lugs L and L', forming the contacts of the commutator. If desired, a pulley may be formed on the armature by a series of projections on the several laminæ in alinement with the shaft K, said projections being formed with notches of different depths, which when the structure is assembled form a substantially round groove M.

To assemble the parts the stampings are placed together with insulation of paper or other suitable material in between, and are secured in any suitable way, such as by projecting lugs N on the outer stamping, which are bent around the assembly. The insulated conductor O is wound around the portion A of the core, one end being attached to a brush member P which is secured by a screw Q or other suitable means upon the field-core member, being insulated therefrom. The brush P will extend to a point where in the rotation of the armature it will alternately contact with the projecting lugs L and L', and by properly positioning these the desired rotary movement of the armature is obtained. The motor is attached to a battery or other source of current by connecting the opposite terminal end of the winding O with one pole and grounding the opposite pole upon the core. This will cause the rapid rotation of the armature when without load, or if desired a light load may be driven through the medium of the pulley M and a cord belt engaging the same.

The construction is one particularly adapted to be marketed in knock-down form and the insulated wire for the coils being furnished but not wound. This will cut down the cost by eliminating the operation which would require the most time, and by suitable instruction the user can easily wind the wire upon the core and complete the structure.

What I claim as my invention is:

1. In an electric motor, a laminated field-core, a revoluble armature and a bearing for said armature formed by an extension of one of the laminæ of the core.

2. In an electric motor, a laminated field-core, a revoluble armature, and alined bearings for said armature formed from extensions of the laminæ.

3. In an electric motor, a laminated U-shaped core, a revoluble armature, and supporting bearings for the armature formed integral with the laminated core, one of said bearings projecting from the center of one of the laminæ and the other bearing being formed from an extension of one of the ends of the core.

4. In an electric motor, a laminated armature and a shaft therefor integral with one of the laminæ.

5. In an electric motor, a laminated armature and a shaft formed of a central extension of one of the laminæ having bent ends.

6. In an electric motor, a laminated field-core and armature formed of sheet-metal stampings, and extensions of the laminæ thereof forming a shaft for the armature and supporting bearings therefor.

7. In an electric motor, a series of sheet-metal stampings forming a laminated field-core, one of said stampings being provided with extensions bent to extend in planes transverse thereto and having alined indentations therein, and an armature provided with a shaft having pointed ends engaging said indentations.

8. In an electric motor, a laminated field-core comprising a series of U-shaped stampings having inwardly-extending lugs on each leg of the U, forming an angularly-grooved pole piece, and an armature mounted to rotate through said angular groove.

9. An electric motor, comprising a laminated field-core and armature formed from sheet-metal stampings, one of the laminæ of said armature being extended transversely to form an armature shaft terminating in pointed ends, and one of the laminæ of the core being provided with extensions having indentations therein, said extensions being bent transversely to aline said indentations and position the same for engagement with the pointed ends of the armature shaft.

10. In an electric motor, a laminated armature formed of a series of sheet-metal stampings one of said stampings having a lateral extension forming an armature shaft and bent lugs on said extension constituting commutator contact points, a field-core for said armature having bearings for engaging said shaft, and a brush mounted on said field-core extending into operative relation to said commutator contact points.

11. In an electric motor, a laminated armature formed from a series of sheet-metal stampings, one of said stampings having an extension constituting an armature shaft, and a plurality of said laminæ being extended and differentially notched to constitute a grooved pulley.

12. In an electric motor, a laminated U-shaped core and a supporting base for said core formed from an extension of one of the laminæ.

13. In an electric motor, a laminated core, and an extension integral with one of the laminæ, wrapped around said core to hold the laminæ from displacement.

14. In an electric motor, a laminated armature formed of a series of sheet-metal stampings, commutator contact points formed integral with the laminæ, a field-core for said armature, a brush mounted on said field-core extending into operative relation to said commutator contact points and the securing end of said brush being slotted, and a clamping screw on said field-core with which the slotted end of said brush is detachably engaged.

In testimony whereof I affix my signature.

FREDERICK C. BASINGER.

Copies of this patent may be obtained for five cents each, by addressing the "Commissioner of Patents, Washington, D. C."